(12) United States Patent
Weber et al.

(10) Patent No.: US 9,442,975 B2
(45) Date of Patent: Sep. 13, 2016

(54) SYSTEMS AND METHODS FOR PROCESSING DATA STORED IN DATA STORAGE DEVICES

(71) Applicant: Guidance Software, Inc., Pasadena, CA (US)

(72) Inventors: Dominik Weber, Los Angeles, CA (US); Matthew Garrett, Whittier, CA (US); Claudiu Teodorescu, Pasadena, CA (US); Rajesh Sharma, Pasadena, CA (US)

(73) Assignee: Guidance Software, Inc., Pasadena, CA (US)

( * ) Notice: Subject to any disclaimer, the term of this patent is extended or adjusted under 35 U.S.C. 154(b) by 586 days.

(21) Appl. No.: 13/802,419

(22) Filed: Mar. 13, 2013

(65) Prior Publication Data
US 2014/0281331 A1     Sep. 18, 2014

(51) Int. Cl.
*G06F 17/30* (2006.01)
*G06F 21/55* (2013.01)

(52) U.S. Cl.
CPC ... *G06F 17/30424* (2013.01); *G06F 17/30616* (2013.01); *G06F 21/552* (2013.01)

(58) Field of Classification Search
CPC ................ G06F 17/30616; G06F 21/552
See application file for complete search history.

(56) References Cited

U.S. PATENT DOCUMENTS

| | | | |
|---|---|---|---|
| 7,752,193 B2 | 7/2010 | Weber | |
| 8,224,848 B2 | 7/2012 | McCreight et al. | |
| 2010/0235392 A1* | 9/2010 | McCreight et al. | 707/780 |
| 2012/0023387 A1* | 1/2012 | Wang | G06F 11/1048 714/773 |
| 2013/0088373 A1* | 4/2013 | Takano | H03M 7/30 341/87 |

* cited by examiner

*Primary Examiner* — Edward Dudek, Jr.
(74) *Attorney, Agent, or Firm* — SoCal IP Law Group LLP; Steven C. Sereboff

(57) ABSTRACT

A system and method for processing data stored in data storage devices is described. A computing processor acquires blocks of data from a target machine and computes an entropy value associated with each block of the acquired data. The computing processor checks the entropy values of each block to determine whether or not the particular block is deemed to contain useful data, before that block is analyzed.

22 Claims, 5 Drawing Sheets

300

| Block | Entropy Value |
|-------|---------------|
| 0 | 2% |
| 1 | 0 |
| 2 | 50% |
| 3 | 85% |
| . | . |
| . | . |
| . | . |
| N | 1% |

FIG. 3

SYSTEMS AND METHODS FOR PROCESSING DATA STORED IN DATA STORAGE DEVICES

FIELD

The present disclosure relates to computer investigations. More particularly, it relates to systems and methods for identifying and processing data stored in data storage devices that are predicted to contain meaningful data.

BACKGROUND

Data storage devices such as hard drives and solid state drives may store data separated into groups referred to as sectors, which may be further separated into subgroups referred to as blocks. Generally, the sectors and blocks are filled with data indicated as binary bits (1's and 0's). When the bits are combined into a string of bits (e.g. 10101010), they form words or bytes, which in turn, form computer files that end users of computing machines may utilize.

During a forensic investigation, data stored in a storage device under investigation may be processed, for example, for searching, indexing, or the like. During such processing, all sectors or blocks of the data storage device are typically processed. However, not all blocks may contain useful data. For example, the blocks may sometime store pattern(s) (e.g. 11001100), or be empty, thus containing all binary 0's (which is also a pattern). Efficiency when searching the data storage device may be improved if the sectors and/or blocks that do not contain data predicted to be useful, may be skipped. Accordingly, what is desired is a system and method for reviewing computer data acquired from a data storage device in a more efficient manner.

SUMMARY

Embodiments of the present invention are directed to a method for examining data. The method may comprise: identifying a first block of data; creating a second block of data based on the identified block of data; assigning a value for the second block of data as a function of a ratio between the second block of data and the first block of data; analyzing the second block of data based on the assigned value; and generating an output based on the analysis of the second block of data.

Embodiments of the present invention may also be directed to a computerized machine for examining data. The computerized machine may comprise: a processor; and a memory, wherein the memory has stored thereon instructions that, when executed by the processor, causes the processor to: identify a first block of data; create a second block of data based on the identified block of data; assign a value for the second block of data as a function of a ratio between the second block of data and the first block of data; analyze the second block of data based on the assigned value; and generate an output based on the analysis of the second block of data.

A person of skill in the art will appreciate that embodiments of the present invention allow identification and processing of blocks of data stored in a file, that are predicted to contain meaningful information. This may reduce the number of blocks that an examining machine will have to process, improving the overall processing or analysis speed.

BRIEF DESCRIPTION OF THE DRAWINGS

The accompanying drawings, which are incorporated into and constitute a part of this specification, illustrate one or more embodiments of the present disclosure and, together with the description of a few example embodiments, serve to explain the principles and implementations of the disclosure. The components in the drawings are not necessarily drawn to scale. Instead, emphasis is placed upon clearly illustrating various principles. Moreover, in the drawings, like reference numerals designate corresponding parts throughout the several views.

FIG. 3 is a graphical illustration of a table comprising entropy values corresponding to each respective block;

DETAILED DESCRIPTION

Figure 1:
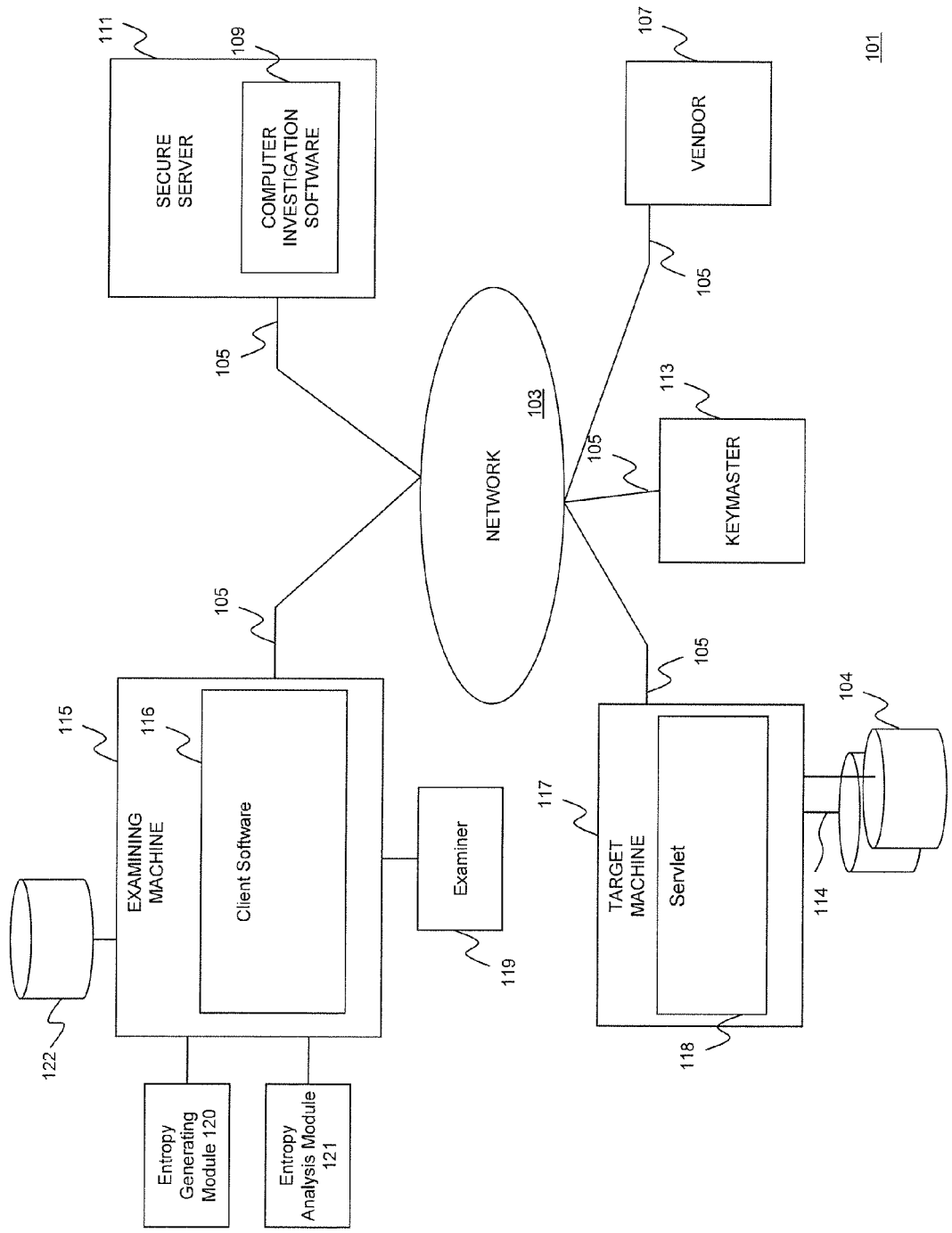
FIG. 1 is a block diagram of an exemplary computer investigation system according to some embodiments of the present disclosure.

In general terms, embodiments of the present disclosure are directed to a forensic investigation system for identifying and processing data stored in data storage devices that are predicted to contain meaningful data. The data may be, for example, target files obtained from a target machine during a forensic investigation. According to one embodiment, an examining machine is configured with instructions to acquire the target files and store them as reference files (also referred to as evidence files) for analysis. In addition to or in lieu of acquiring target files, a copy of a hard drive associated with the target machine may also be made and stored in an evidence file. In performing, for example, forensic investigation of the target machine through use of the examining machine, a user performing the forensic investigation (e.g. an investigator or an examiner) may desire to identify certain data from the reference files. In this regard, the reference files may be analyzed to display an image or text on a display screen, search for keywords, index certain files, obtain hash values of the obtained data, or perform other processes appreciated by those persons skilled in the art.

According to one embodiment, in processing a reference file during a forensic investigation, blocks in the reference file that are predicted to contain useful and meaningful data are identified and provided to an analysis engine. In this regard, sectors or blocks of the file that are not deemed to contain useful and meaningful data are skipped or ignored. Certain types of blocks that may be deemed to not contain useful and meaningful data include, for example, blocks that store patterns (e.g. ABABA), are empty (store all binary 0's), are encrypted, and the like. For example, if a whole block is filled with some kind of pattern, then that block may be deemed to not contain real text (e.g. Hello World) because real text would likely not fill the whole block with a pattern. A whole block may be filled with a pattern because a block (or sector) has never been written to, and thus contain default data put there during manufacturing (e.g. all 0's or all FF). In some cases, the block may be filled with a pattern if the file is truly a binary file, or if the data on the block has been deleted for re-use and/or a forensic wipe.

According to an embodiment of the present disclosure, entropy values are assigned for each block of the reference file generated by the examining machine based on the randomness of each block of data. In this regard, if a block is less random than another block because it contains patterns (e.g. 0's or other patterns), a lower entropy value is assigned to the block. If a block is more random than another block because it does not contain patterns, a higher entropy value is assigned to the block as such a block is more likely to contain meaningful data. According to one embodiment, randomness of a block may be linked to how well the block compresses. For example, data that is very random in a given block is not likely going to compress as much relative to data that forms a pattern. According to one embodiment, a block of data obtained from a target machine (referred to as a target block) is processed via a compression algorithm and stored as a reference block. The size of the reference block is compared against the size of the target block for assigning the entropy value. The smaller the size of the reference block as compared to the size of the target block, the less random the data and lower the entropy value.

According to one embodiment, data blocks are identified as meaningful or not, based on the assigned entropy values. The range of the entropy values that may be correlated to meaningful data may be user defined. The range may be set to avoid extreme entropy values, including extremely low entropy values and extremely high entropy values. As discussed, a low entropy value associated with a target block may be indicative that the block is empty or contains patterns, and thus, is not very meaningful. A very high entropy value, however, may also indicate data that is not useful for analysis. For example, if the target block is already compressed (e.g. an mp3 file, a zip file, etc.), is encrypted, and the like, the target block will not compress much, if any, and the entropy value will be very high. Such blocks may not be capable of being processed for analysis, however. Thus, it may be desirable to exclude such blocks from analysis.

According to embodiments of the present invention, every block of the target file acquired by the examining machine may have an associated entropy value assigned and recorded. Thus, when analyzing or processing the reference files, an investigator may set the examining machine to analyze or process only the blocks that have assigned entropy values within a range selected based on the particular analysis or process that is being performed. This may reduce the number of blocks that the examining machine will have to process, helping to improve overall processing or analysis speed.

FIG. 1 is a block diagram of an exemplary computer investigation system 101 that may be used to create evidence files during a forensic investigation session. The computer investigation system 101 includes various network devices coupled to a data communications network 103 over data communication links 105. The data communications network 103 may be a computer network, such as, for example, a public Internet, a private wide area network (WAN), a local area network (LAN), or other wired or wireless network environment conventional in the art. The network devices may include a vendor computer 107, a secure server 111, an examining machine 115, one or more target machines 117, and a keymaster computer 113. The data communication link 105 may be any network link conventional in the art, such as, for example, a direct wire, an infrared data port, a wireless communications link, global communications link such as the Internet, or any other communications medium known in the art.

A vendor having access to the vendor computer 107 provides the organization with a computer investigation software 109 which enables the organization to effectively perform forensic investigations, respond to network safety alerts, and conduct network audits and other investigations over the data communications network 103.

According to one embodiment of the invention, the investigation software is stored in a computer readable medium (e.g. ROM, flash memory, magnetic computer storage device, optical discs, and the like), that is accessed by the secure server 111. According to one embodiment of the invention, the computer investigation software 109 provides computer program instructions which, when executed by one or more processors resident in the secure server 111, cause the secure server to broker safe communication between the examining machine 115 and the target machines 117. The computer investigation software further facilitates the administration of users, logs transactions conducted via the server, and controls access rights to the system.

The examining machine 115 (which may also be referred to as the "client" or "client machine") allows an authorized examiner to conduct searches of the target machines 117 and their associated secondary storage devices 104. In this regard, the examining machine 115 is a computer device with a processor configured to access a computer-readable media storing client software 116 which includes the functionality and interoperability for remotely accessing the secure server 111 and corresponding target machines 117. For example, the processor may execute the client software to search one or more target machines for target files in order to create evidence files. The client software may also include an analysis engine for processing the evidence files based on the type of forensic investigation that is to be performed.

Each target machine 117 is exemplarily the subject of a computer investigation conducted by the examining machine 115. The target machine may be a portable device such as, for example, a laptop, personal digital assistant, or any device that may connect and disconnect from the network.

According to one embodiment of the invention, each target machine 117 is coupled to one or more secondary storage devices 104 over an input/output connection 114. The storage devices include any nonvolatile storage media such as, for example, hard disks, diskettes, Zip drives, redundant array of independent disks (RAID) systems, holographic storage devices, flash drives, or any other device configured to store data that may be subject to an investigation.

According to one embodiment, a servlet 118 installed on a particular target machine 117 responds to commands provided by the examining machine 115 to remotely discover, preview, and acquire dynamic and/or static data stored at the target machine and/or the associated secondary storage device(s) 104 (sometimes collectively referred to as target device or machine), and transmit the acquired data to the examining machine via the secure communication path created between the target machine and the examining machine. The acquired data may be stored, for example, in a mass storage device 122 coupled to the examining machine. The mass storage device 122 may be similar to the storage device 104 coupled to the target machines. The servlet may be implemented as any software module conventional in the art, and is not limited to applets in a web browser environment. Computer instructions for implementing the servlet may be stored in a computer readable media (e.g. ROM, flash memory, magnetic computer storage device, optical discs, and the like), that is accessed by the target machine.

The computer investigation system 101 illustrated in FIG. 1 further allows an authorized examiner direct or remote access to the examining machine 115 via an examiner device 119 in any manner conventional in the art. The examiner device 119 may be an input and/or output device coupled to the examining machine 115, such as, for example, a keyboard and/or monitor. The examiner device 119 may alternatively be a personal computer or laptop communicating with the examining device over a wired or wireless communication mechanism. According to one embodiment of the invention, the examiner is a trusted individual who safely stores in the examining machine 115, one or more encryption keys used for authenticating to the secure server 111 and conducting the secure investigation of the target machines 117, as is described in more detail in U.S. Pat. No. 6,792,545, the content of which is incorporated herein by reference.

According to one embodiment of the present disclosure, the client software 116 includes an entropy generating module 120 and an entropy analysis module 121 configured to compute an entropy value for each block of data acquired from the target machine 117 and/or the associated secondary storage device(s) 104, and analyze such entropy values when processing the evidence files. The files in the secondary storage device(s) 104 of the target machine may be transmitted to the examining machine over the data communication links 105. The files may also be obtained directly by making a disk image of the secondary storage device(s) 104.

According to some embodiments of the present disclosure, the examining machine 115 and target machine 117 each includes a processor operatively coupled via a system bus to a main memory and an input/output (I/O) interface control unit. The I/O interface control unit is operatively coupled via an I/O local bus to a storage controller. The processor is coupled via the I/O interface control unit, the I/O local bus, and the storage controller, to a computer-readable medium such as, for example, a storage device. Computer program instructions for implementing different functionalities of the client software 116 or servlet 118, including the functionalities of the entropy generating module 120 and the entropy analysis module 121 are stored in the storage device until the processor retrieves the computer program instructions and stores them in the main memory. The processor then executes the computer program instructions stored in the main memory to conduct a forensic investigation of a target device.

The machine 115, 117 further includes one or more output devices coupled to the I/O local bus via one or more output controllers. Such output devices may include, for example, a display device for displaying information such as, for example, contents of a file that was searched during the investigation. The machine 115, 117 further includes one or more user input devices coupled to the I/O local bus via an input device controller. A user may use a user input device to configure various parameters of the entropy generating module 120 and/or the entropy analysis module 121.

Commands from the secure server 111 may be received by a wired or wireless network interface device controlled by a network interface control unit, and forwarded to the processor via the system bus. Direct communication between the examining machine 115 and target machine 117 may also enabled by the network interface device.

Although the entropy generating module 120 and entropy analysis module 121 are described as being software modules, a person of skill in the art should recognize that the entropy generating and analysis modules may also be implemented via firmware (e.g. ASIC), hardware, or a combination of software, firmware, and hardware. Also, although the modules 120, 121 are assumed to be separate functional units, those of skill in the art should recognize that the functionality of the modules may be combined or integrated into a single module, or further subdivided into further sub-modules without departing from the spirit of the invention.

Figure 2:
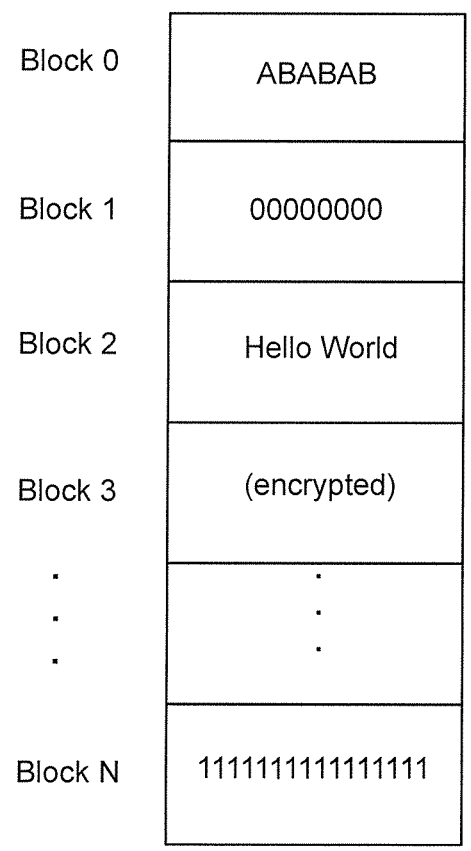
FIG. 2 is a graphical illustration of an exemplary computer readable medium depicting example data stored in the data storage device.

FIG. 2 graphically illustrates an exemplary target file 200 acquired from the data storage device 104 of the target machine 117. Although FIG. 2 is described in terms of a target file, a person of skill in the art should recognize that it may also depict the layout of a target storage device that is copied by the examining device as an evidence file.

In the illustrated example, blocks 0 and N store data that form a pattern. Block 1 is an empty block storing binary 0's. Block 2 stores the phrase "hello world" which has no particular pattern and is therefore considered random. Block 3 stores encrypted data, while block N stores another pattern comprising all 1's.

According to one embodiment, the target file 200 is acquired during, for example, an acquisition phase of an investigation session. According to one embodiment, the acquired target files are compressed and stored as a reference file in a data storage device associated with the examining machine 115. The compression of the target file may be on a block by block basis. The size of the block may be set during the acquisition phase. The block size may be, for example, 64 k bytes or any other size conventional in the art.

Any conventional compression algorithm known in the art, such as, for example, one of various Lempel-Ziv (LZ) compression methods, may be used, for example, by the client software 116, to perform the compression. For example, a chosen compression method may take the first 8 bits or the last 8 bits of data in a particular block to be compressed, and determine whether or not those 8 bits may be found repeating anywhere else in the rest of the block of data. In creating the reference file, only one instance of the repeating pattern may be stored for the block instead of storing each instance of the pattern.

According to one embodiment, the entropy generating module 120 is configured to take a block in the reference file (referred to as a reference block) and assign an entropy value for the block. The assignment of the entropy value may be concurrent with the generating of the reference file, or after the reference file has been generated.

According to one embodiment, the entropy value for a particular reference block is a function of a ratio between the reference block and a corresponding target block from the target file. According to one embodiment, the function converts the ratio into a percentage value (e.g. 0-100%) according to the following formula:

$$\text{entropy value for block } n = (\text{size of reference block } n \div \text{size of target block } n) \times 100$$

According to one embodiment, instead of invoking the above formula for an empty block of data storing all binary 0's, the entropy value for such a block is assumed to be 0.

According to one embodiment, the entropy value for each block is stored in association with the block. For example, the entropy value may be stored as sideband data (e.g. metadata) in the mass storage device 122. The sideband data may be stored, for example, as a table that comprises a variety of information. By way of example and not of limitation, the table may include information that maps the reference file block of compressed data (e.g. offset and/or size) to the original block location of the target file. The table may also include pattern information of the file, instead of the offset and/or size of the file. In some embodiments, the table may include indicators (e.g. flags) that indicate whether a block is, for example, a compressed block, uncompressed block, or a pattern.

Figure 3:
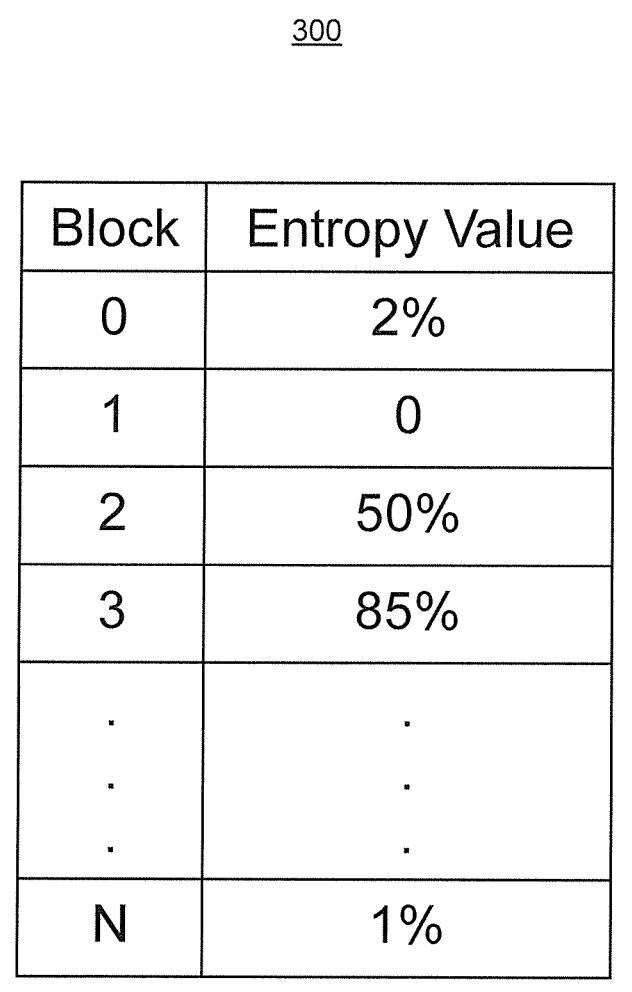

FIG. 3 is an exemplary layout diagram of a table 300 storing entropy values for various blocks of data in a reference file according to one embodiment of the invention. The entropy values stored in the table 300 are assumed to be for blocks of the reference file generated upon compressing the target file 200 of FIG. 2. In the illustrated table 300, an entropy value of 2% (or simply 2) is stored for block 0 indicative of the high degree of pattern of the data (ABA-BAB) stored in block 0 of the target file 200. An entropy value of 0 is stored for block 1, indicating that block 1 of the target file 200 is empty. An entropy value of 50% is stored for block 2 indicative of the fact that block 2 of the target file stores random data ("hello world") exhibiting no particular pattern. An entropy value of 80% is stored on block 3 due to the fact that block 3 of the target file 200 stores encrypted data which could not be compressed very well. An entropy value of 1% is stored for block N indicative of the high degree of pattern of the data (all 1's) stored for block N of the target file 200. According to one embodiment, a separate table is maintained for each reference file.

According to one embodiment, a determination of whether a block of data is empty or not may be based on a usage table of the storage device storing the target file 200. According to one embodiment, the usage table keeps track of the number of times each block has been written to according to conventional mechanisms. Thus, the usage table may store a value of 0 for a block if data was never written to the block.

Usage table may exist, for example, in flash drives. Thus, if a target storage device 104 that is to be copied is a flash drive, the usage table in the flash drive may be inquired for determining whether a particular block in the storage device is empty. The entropy value for an empty block may be set during the acquisition of the target storage device based on data retrieved from the usage table.

Figure 4:
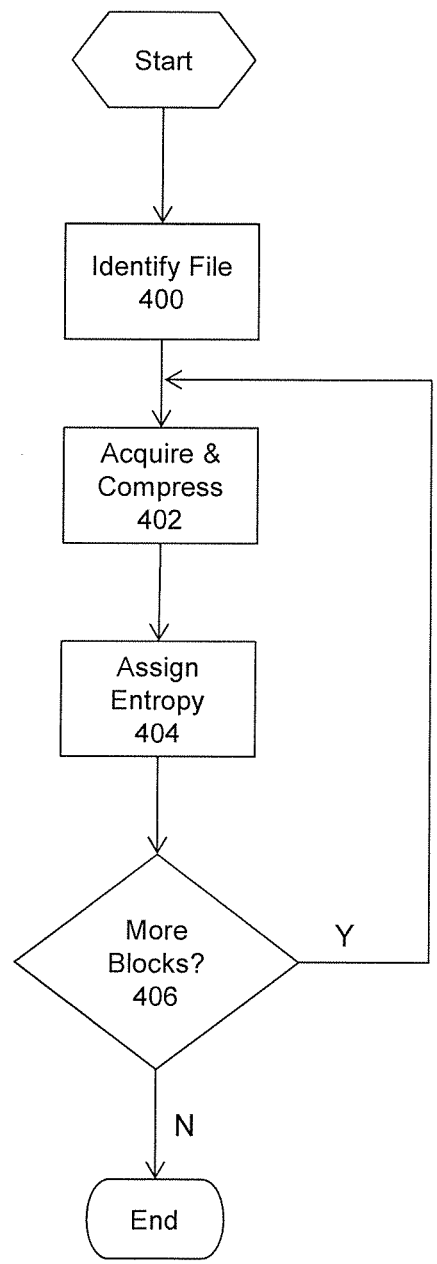
FIG. 4 is an exemplary flow diagram of a process of creating an evidence file.

FIG. 4 is an exemplary flow diagram of a general process of creating an evidence file and assigning entropy values for the evidence file according to some embodiments of the present disclosure.

In step 400, the client software 116 on the examining machine 115 identifies a file to be acquired from the target machine 117. The identification may be, for example, in response to a user input identifying the file, or input of criteria used by another device to identify the file. Step 400 may be skipped, however, if an image of an entire hard drive associated with the target machine 117 is to be made, instead of copying a single file. In either embodiment, the client software 116 proceeds to acquire data from the target machine on a block by block basis. The size of the block may be preset or determined dynamically.

In step 402, the client software 116 acquires and compresses the block according to standard mechanisms, and stores the compressed block in an evidence file.

In step 404, the entropy generating module 120 calculates an entropy value for the block and stores the entropy value in association with the corresponding block. In this regard, the entropy generating module 120 obtains a size of the compressed block and compares it against the size of the original block from the target device. The less random the data in the target block, the smaller the size of the compressed block. The smaller the size of the compressed block, the smaller the assigned entropy value.

In step 406, a determination is made as to whether there are any other blocks to process. If the answer is YES, steps 402-406 are repeated until all blocks of the identified file have been acquired and the evidence file is created.

Figure 5:
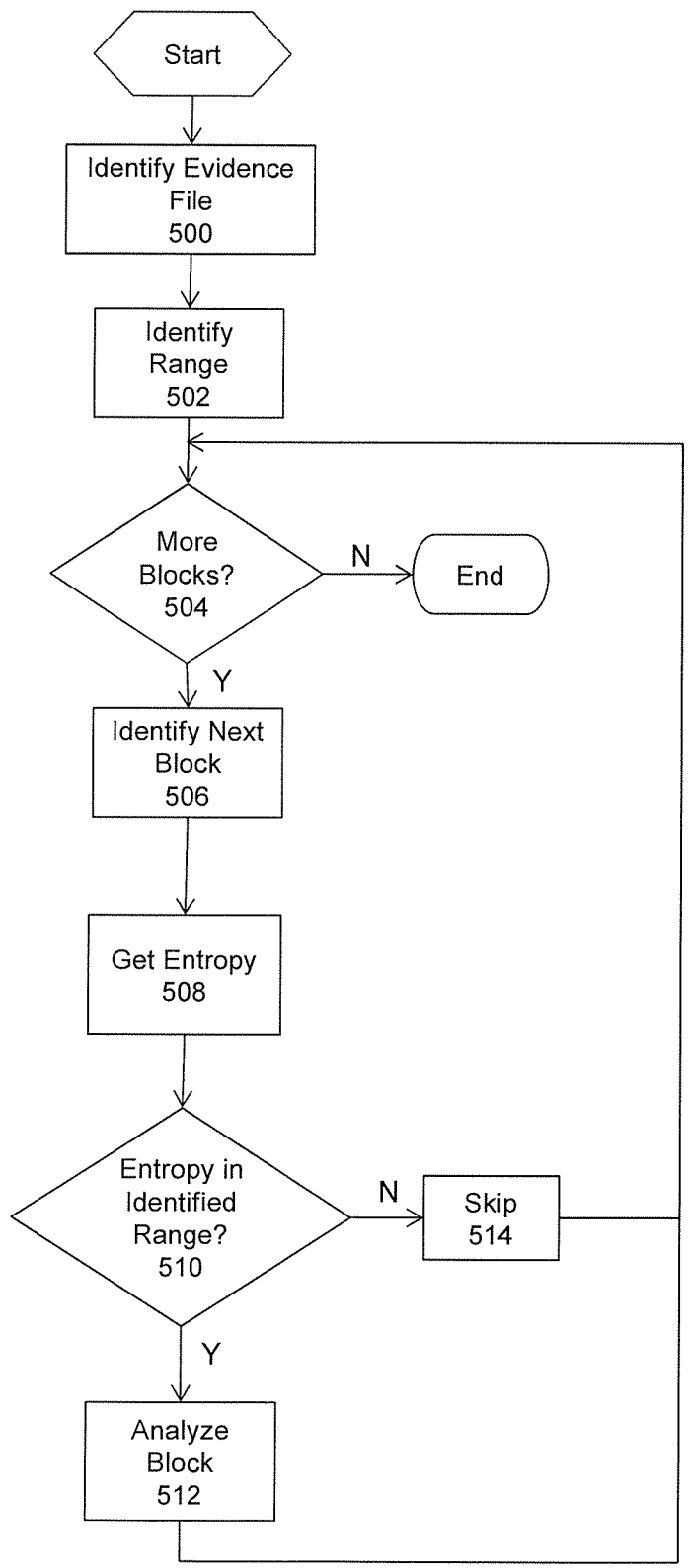
FIG. 5 is an exemplary flow diagram of a process for analyzing the evidence files.

FIG. 5 is a flow diagram of a process for processing an evidence file according to an embodiment of the present disclosure. The process starts, and in step 500, the client software 116 identifies the evidence file to be processed. The identification may be, for example, in response to detecting a command, by the client software 116, to search the evidence file (or a group of evidence files) for a particular key word.

In response to such a command, the client software 116 may invoke the entropy analysis module 121 for identifying blocks of the identified evidence file that are predicted to contain meaningful data based on a given range of entropy values. In this regard, in step 502, the entropy analysis module 121 identifies the meaningful range of entropy values based on set minimum and maximum threshold values. The threshold values may be set by the examiner via the examiner device 119. The selected threshold values may depend, for example, on the type of analysis to be conducted. For example, data having high entropy and low entropy may be deemed to not contain useful information when performing electronic discovery. In other situations, such as when performing a forensic examination, compressed data (data having high entropy) may be deemed to contain useful information, while data having low entropy may be deemed to not contain useful information. In further situations, such as when performing a raw disk workflow, entropy information may be ignored and all blocks are considered to potentially contain useful information.

In step 504, a determination is made as to whether there are any more blocks of the evidence file to process. If the answer is YES, the entropy analysis module 121 proceeds to identify, in step 506, a first block to be processed, and in step 508, retrieves the assigned entropy value associated with that block. In step 510, a determination is made as to whether the retrieved entropy value is within the meaningful range. If the answer is NO, the block is not identified as potentially containing meaningful data (e.g. skipped) in step 514, and a next block is analyzed.

If, however, the retrieved entropy value is within the meaningful range, the block is returned to the analysis engine of the client software 116 as a meaningful block in step 512, and the analysis engine proceeds to analyze it accordingly. According to one embodiment, the analysis occurs after identification of each meaningful block of data. The analysis may also be done, however, after all meaningful blocks of the evidence file have been identified.

The result of running the process of FIG. 5 for the target file 200 of FIG. 2 based on the entropy values stored in the table 300 of FIG. 3 will now be described as an example. For purposes of this example, it is assumed that the minimum threshold value set by the examiner is 5%, while the maximum threshold value is 80%. Block 0 has an entropy of 2% due to the pattern of the data stored in block 0. Since 2% is below the set minimum threshold, it is skipped and not processed. The next block of the file (block 1) has an entropy value of 0 because the block contains no data, and is therefore also skipped. Block 2 is identified as a meaningful block because it is assigned an entropy value of 50% which falls within the set range. Block 2 is therefore processed according to the processing that is desired. For example, if the processing involves searching for an input keyword, the data stored in block 2 ("hello world"), and compared against the input keyword for determining a match or no match. According to one embodiment, the analysis continues to block 3 regardless of the output indicating a match or no match. According to another embodiment, the analysis stops upon finding a match.

If processing continues to block 3, the assigned entropy value is 85%. This entropy value is above the identified maximum threshold, and is thus also ignored. Finally, block N is also ignored due to the assigned entropy value of 1% falling below the identified minimum threshold.

Although this invention has been described in certain specific embodiments, those skilled in the art will have no difficulty devising variations to the described embodiment which in no way depart from the scope and spirit of the present invention. Furthermore, to those skilled in the various arts, the invention itself herein will suggest solutions to other tasks and adaptations for other applications. It is the Applicants' intention to cover by claims all such uses of the invention and those changes and modifications which could be made to the embodiments of the invention herein chosen for the purpose of disclosure without departing from the spirit and scope of the invention. Thus, the present embodiments of the invention should be considered in all respects as illustrative and not restrictive, the scope of the invention to be indicated by the appended claims and their equivalents rather than the foregoing description.

What is claimed is:

1. A method for examining data, the method comprising:
   identifying a first block of data;
   compressing the first block of data for generating a second block of data having a size smaller than a size of the first block of data;
   comparing the size of the second block of data against the size of the first block of data;
   assigning a value for the second block of data based on the comparing;
   analyzing content of the second block of data based on the assigned value; and
   generating an output based on the analysis of the second block of data.

2. The method of claim 1, wherein the analyzing content of the second block based on the assigned value comprises:
   identifying the value assigned to the second block;
   determining whether the identified value is within a set range of values; and
   processing the second block in response to determining that the identified value is in the set range of values.

3. The method of claim 2 further comprising:
   skipping the second block from processing in response to determining that the identified value is outside the set range of values.

4. The method of claim 2, wherein the range of values is selected such that any second block of data having values outside of the range is presumed to not contain meaningful data.

5. The method of claim 1, wherein the first block of data is obtained from a target machine.

6. The method of claim 1, wherein the assigning the value comprises:
   computing the value; and
   storing the computed value in association with the second block.

7. The method of claim 1 further comprising:
   detecting a third block as being empty based on usage information relating to the third block; and
   assigning a second value indicative of a fourth block being empty.

8. The method of claim 1, wherein the second block of data is created by an examining machine.

9. The method of claim 1, wherein the second block of data is compressed based on a lossless data compression algorithm.

10. The method of claim 9, wherein the assigning the value includes computing a ratio of a size of the second block of data, and a size of the first block of data.

11. The method of claim 1, wherein the value is an entropy value.

12. A computerized machine for examining data, comprising:
    a processor; and
    a memory, wherein the memory has stored thereon instructions that, when executed by the processor, causes the processor to:
    identify a first block of data;
    compress the first block of data for generating a second block of data having a size smaller than a size of the first block of data;
    compare the size of the second block of data against the size of the first block of data;
    assign a value for the second block of data based on the comparing;
    analyze content of the second block of data based on the assigned value; and
    generate an output based on the analysis of the second block of data.

13. The machine of claim 12, wherein in analyzing content of the second block based on the assigned value, the processor is configured to:
    identify the value assigned to the second block;
    determine whether the identified value is within a set range of values; and
    process the second block in response to determining that the identified value is in the set range of values.

14. The machine of claim 13, wherein in analyzing content of the second block based on the assigned value, the processor is configured to:
    skip the second block from processing in response to determining that the identified value is outside the set range of values.

15. The machine of claim 13, wherein the range of values is selected such that any second block of data having values outside of the range is presumed to not contain meaningful data.

16. The machine of claim 12, wherein the first block of data is obtained from a target machine.

17. The machine of claim 12, wherein in assigning the value, the processor is configured to:
    compute the value; and
    store the computed value in association with the second block.

18. The machine of claim 12, wherein in assigning the value, the processor is configured to:
    detect a third block as being empty based on usage information relating to the third block; and
    assign a second value indicative of a fourth block being empty.

19. The machine of claim 12, wherein the second block of data is created by an examining machine.

20. The machine of claim 12, wherein the second block of data is compressed based on a lossless data compression algorithm.

21. The machine of claim 12, wherein in assigning the value, the processor is configured to:
    compute a ratio of a size of the second block of data, and a size of the first block of data.

22. The machine of claim 12, wherein the value is an entropy value.

* * * * *